Aug. 11, 1964 C. S. COFFEY 3,144,565

TRANSFORMER COUPLED MULTIVIBRATOR

Filed Aug. 15, 1962

INVENTOR.
CHARLES S. COFFEY
BY Cadwallader And Kelly
ATTORNEYS

United States Patent Office 3,144,565

Patented Aug. 11, 1964

3,144,565

TRANSFORMER COUPLED MULTIVIBRATOR

Charles S. Coffey, New Brunswick, N.J., assignor to Edgerton, Germeshausen & Grier, Inc., Boston, Mass., a corporation of Massachusetts Filed Aug. 15, 1962, Ser. No. 217,095
1 Claim. (Cl. 307—88.5)

This invention relates to multivibrators, and more particularly to memory circuits for controlling multivibrators.

Bistable multivibrators are well known in the prior art. A large number of different types of these "flip-flop" circuits have been used, including those employing a wide variety of electron tubes, and transistors. One limitation found in all the prior art multivibrators of which I am aware, is the low upper limit at which these circuits may be operated. Even with the high-speed switching capabilities of some of today's transistors, the maximum operating frequency of prior-art multivibrator circuits is about 20 megacycles. Only by resorting to complex arrangements including additional amplifying devices can this maximum be increased.

The principal reason for this low frequency is the resistance-capacitive (RC) circuits employed to allow the multivibrator to shift from its first mode of operation to its second. The RC time constant of these circuits controls the time in which the multivibrator shifts from one mode to the other. The smaller the RC time constant can be made, the faster the circuit will shift and the greater its operating frequency. Even in the well-known Eccles-Jordan Multivibrator which is probably the simplest and fastest of the prior-art devices, this time constant cannot be reduced to a point where the operating frequency is greater than about 20 mc. The resistance (R) component of the RC time constant cannot be reduced beyond certain prescribed limits which are determined by the power requirements of the switching device. Furthermore, the amplitude of the output pulse is decreased when R is reduced. With respect to the capacitance (C) factor, reduction is limited by the inherent capacity of the switching device and the stray capacitance in the circuitry. After C is reduced beyond a certain value, its compensating effect with respect to the inherent capacities is lost and the overall switching capability of the multivibrator has reached its peak.

A further disadvantage of an RC circuit is that the capacitor is only a coupling device as far as the shut-off or turn-on times are concerned. The capacitor does not aid in the switching, but rather it is a passive element which merely allows the regenerative action of the multivibrator to start and to continue.

Some binary circuits operate in such a manner that the "on" transistor is in saturation, but this mode of operation seriously restricts the speed of operation simply because it takes additional time to deplete the abnormal density of minority carriers that are stored in the base region of the transistor before the "on" transistor will switch to the "off" condition. Similarly, there are other binary circuits utilizing electron tubes which operate in such a manner that the "on" tube is in saturation, but again, this mode of operation seriously restricts the speed of switching, because it takes time for the tube to change from saturation to cut-off.

It is, therefore, an object of this invention to provide a new and novel multivibrator that is not subject to the foregoing disadvantages.

Another object is to provide a high-speed bistable multivibrator.

A further object of this invention is to provide a multivibrator having a simple memory circuit which dynamically assists in the switching from one mode to the other.

Still another object is to provide a multivibrator whose switching capabilities are not critically limited by the power requirements of the amplifying devices.

Other and further objects of this invention will be found in the specification and the appended claim. In summary, my invention resides in a multivibrator having a pair of amplifying devices whose output circuits are inductively coupled to the control element of the other device to effect switching between the two devices. Constructional details are hereinafter set forth in detail.

By using inductive coupling for the memory circuit in contrast to the RC circuit found in the prior art, the switching time of the multivibrator is so greatly increased that its maximum frequency is more than ten times that of the prior art. This high-speed switching is accomplished because the time constant of the inductive memory circuit is $L/R$ where L is the inductance in each winding of the memory transformer and R is the resistance in the output circuit of the amplifying device. It will be noted that the value of L may be made very small, limited only by its physical size. On the other hand, since the resistance R is in the denominator, the larger the value of R, the shorter the time constant. Thus, the prior art problem of designing an RC circuit with a small time constant is not a problem at all in an inductive memory circuit.

As I have pointed out above, the capacitive element of an RC circuit is passive in the sense that it permits a pulse to pass therethrough without contributing any active effect to switching. In my invention, however, the energy stored in the winding dynamically acts to assist in the switching operation.

In addition, means are provided for operating the amplifying devices in an unsaturated mode in order to decrease the time required to render the device non-conducting.

The novelty of this invention will be better understood upon consideration of the following detailed description and the accompanying drawings in which.

Figure 1:
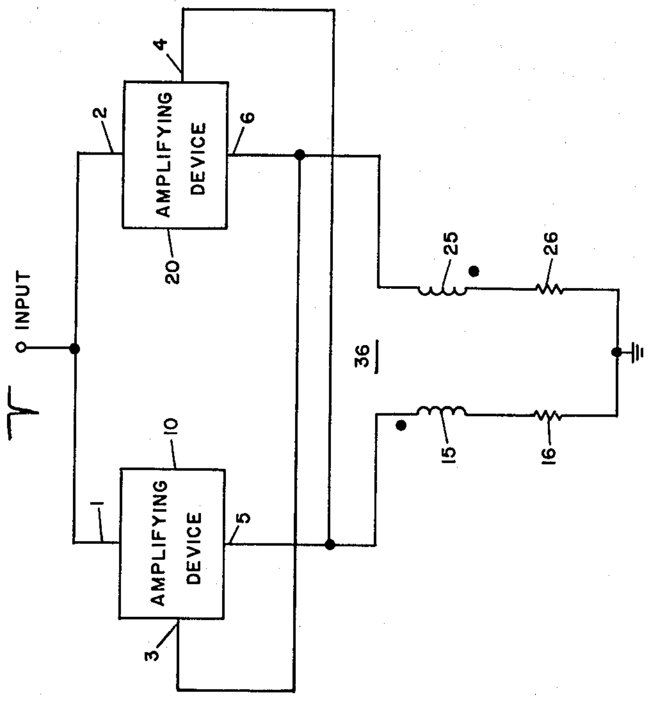
FIGURE 1 is a diagrammatic drawing of my invention.

With reference to FIGURE 1, assume for static conditions that the amplifying device 10 is "on" (conducting) and that the amplifying device 20 is "off" (non-conducting). Hence, current will flow from the output electrode 5 through winding 15 of the memory transformer 36 and the output resistor 16 to ground. Because this current flows through winding 15, there will be a charge contained therein. Since there is little or no current flow in the "off" device 20, there is no charge contained in winding 25 of memory transformer 36.

To effect flip-flop action, a triggering pulse is applied to the Input terminal and thence to input electrodes 1 and 2 of the amplifying devices 10 and 20, respectively. This pulse of energy is of the proper polarity and of sufficient magnitude to momentarily cut off amplifying device 10. Since the amplifying device 20 has similar characteristics to those of device 10 and is "off", the input pulse will have no effect upon it. Now that there is no output current in winding 15 of memory transformer 36 to sustain the charge contained therein, the inductor 15 will discharge through the output circuit of amplifying device 10. The discharge of the energy in winding 15 creates a voltage therein which is coupled to the control electrode 4 of amplifying device 20. The polarity and magnitude of this voltage is such it will cause device 20 to conduct once the triggering pulse has passed. Simultaneously, the voltage in winding 15 induces a voltage in winding 25 which is coupled to the control electrode 3 of device 10. The voltage applied to control electrode 3 will hold device 10 in a state of non-conduction. The circuit is so designed, and the source of triggering impulses is so selected, that the voltages derived from memory transformer 36 have a longer duration than the triggering impulses. When the triggering impulse has passed, the voltage applied to control electrode 4 from winding 15 causes amplifying device 20 to conduct, and the voltage coupled to control electrode 3 from winding 25 prevents amplifying device 10 from conducting. Thus, the multivibrator has flipped to its second mode of operation. Once device 20 starts to conduct, it will continue to conduct, because the control electrode of the now "on" device is connected to the output circuit of the now "off" device and the voltage at that connection is sufficient to hold device 20 "on" and device 10 will be held in the "off" condition because its control electrode 3 is cross coupled to the output of device 20 and is biased to cutoff by the voltage developed across output resistor 26. The multivibrator will remain in this stable state until another input pulse is applied to the Input terminal to drive conducting device 20 to a state of non-conduction, resulting in a reversal of aforesaid action which brings the binary back to its original state.

Figure 2:
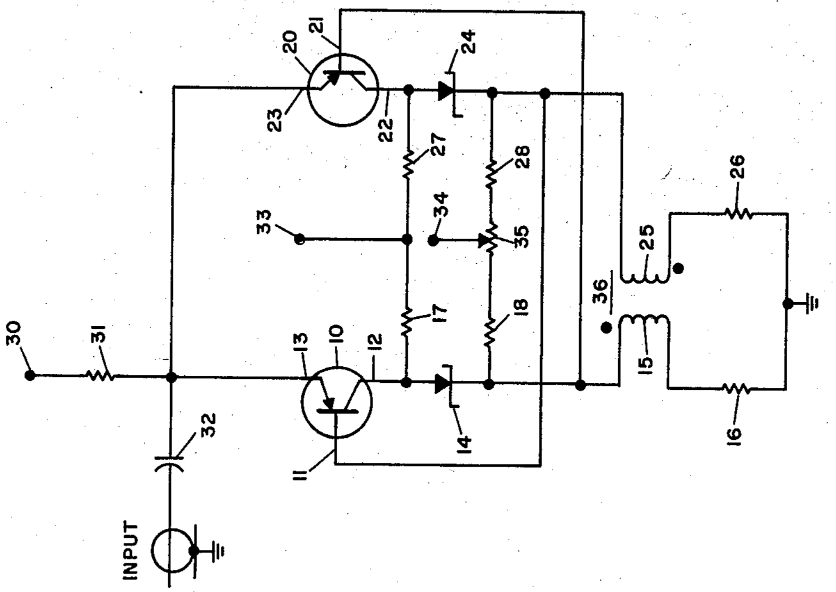
FIGURE 2 is a preferred embodiment of my invention.

Referring now to FIGURE 2, there is shown a bistable multivibrator comprising PNP transistors 10 and 20 with emitters 13 and 23, bases 11 and 21, collectors 12 and 22, respectively. The emitters 13 and 23 are connected through resistor 31 to the positive side of a suitable power supply 30. The emitters 13 and 23 are also connected to coupling capacitor 32 which, in turn, is connected to the Input terminal. Base 11 of transistor 10 is connected to winding 25 of memory transformer 36 and thence through output resistor 26 to ground. Base 21 of transistor 20 is similarly connected to winding 15 of memory transformer 36 through output resistor 16 to ground. Base 11 is also connected to Zener diode 24, whose other terminal is connected to the collector 22 of transistor 20. Base 21 correspondingly is connected to Zener diode 14, whose other terminal is connected to the collector 12 of transistor 10. Collector 12 is connected to biasing resistor 17, whose other terminal is connected to negative power supply 33. Correspondingly, collector 22 is connected to the biasing resistor 27, whose other terminal is also connected to negative power supply 33. Collector 12 is also connected to Zener diode 14, the other terminal of which is connected through bucking resistor 18, to current-balancing potentiometer 35, whose moveable arm is connected to positive power supply 34. Similarly, collector 22 is connected to Zener diode 24, whose other terminal is connected through bucking resistor 28, to the other end of potentiometer 35. Resistors 17 and 27 act as biasing resistors for collectors 12 and 22. The voltage supply 30 and resistor 31 constitute a constant current source for emitters 13 and 23, respectively.

While the circuit shown incorporates bucking resistors 18 and 28, they may be omitted without seriously affecting the operation of the multivibrator. Their only purpose is to reduce the current in the inductor connected to the non-conducting transistor to zero. However, a constant current can be tolerated in the inductor connected to the non-conducting transistor because it is the change in current in the winding of memory transformer 36 connected to the conducting transistor that is important. If said resistors are to be removed, minor changes may be made in component and voltage supply values to obtain the proper static biasing voltages.

As an example, the following values of the circuit elements may be used for 200 mc. multivibrators:

| | |
|---|---|
| R17, R27 | 1.2K ohms. |
| R18, R28 | 2K ohms. |
| R16, R26 | 68 ohms. |
| R31 | 3.3K ohms. |
| R37 | 1K ohm potentiometer. |
| C32 | 15 picofarads. |
| L15, L25 | .2 microhenry. |
| T36 | 1:1 memory transformer (1½ turns each side, #19 wire). |
| V30 | +22 volts. |
| V33 | −22 volts. |
| V34 | +22 volts. |
| Q10, Q20 | Philco 2N769. |
| D14, D24 | Hughes Zener Diode 1N708 (6 volt diodes). |

As in typical bistable multivibrators, one transistor is going to be in the conduction stage while the other will be cut off. Therefore, assume that transistor 10 initially is conducting. The voltage drop across resistor 16 is applied to the base 21 with a value and polarity sufficient to raise the base 21 voltage more positive than the emitter 23 voltage, thereby maintaining transistor 20 non-conducting by this reverse bias. The non-conducting transistor 20, produces no voltage at resistor 26, effectively grounding base 11 so that its potential is negative with respect to emitter 13, thus forward biasing the emitter-base junction of transistor 10, allowing it to conduct. Voltage supply 33 in conjunction with resistors 17 and 27 reverse biases the collector-base junctions of transistors 10 and 20, respectively.

Because transistor 10 is conducting, collector current is flowing through winding 15 of memory transformer 36 and a charge is contained therein. The charge will remain as long as the now "on" transistor remains conducting. Little or no charge will be developed in winding 25 of the memory transformer 36 for there is little or no current therein because transistor 20 is in the "off" condition. When a negative triggering impulse of sufficient magnitude is applied to the Input, coupled through the coupling capacitor 32, to both emitters 13 and 23, it has no effect on transistor 20 because it is off. The triggering impulse applied to emitter 13 clears the transistor 10 of its minority carriers and momentarily cuts transistor 10 off. Because transistor 10 is now off, winding 15 of the memory transformer 36 will start to discharge producing a pulse of negative voltage which is applied directly to the base 21 of transistor 20. This voltage will tend to turn "on" transistor 20 when the input pulse has passed. Because of the coupling action of the memory transformer 36, the pulse of voltage present at winding 15 caused by the discharge therein, will induce a positive voltage at winding 25 of the memory transformer 36 that will be of the same magnitude as the pulse of voltage applied to base 21 of transistor 20. This coupled voltage developed in winding 25 is connected directly to base 11 of transistor 10 keeping transistor 10 "off" after the input pulse has passed. When the input trigger signal has passed, the base biasings are reversed from their previous state and the circuit flips to its complementary stable state. The bistable multivibrator will now stay in this complementary position until another triggering pulse is applied to the input terminals, thereby enabling the multivibrator to revert to its previous stable condition.

This multivibrator is inherently fast because the initial switching is done in the common base configuration. The bases do not switch until effectively all the storage charge has been removed from the junction region. To further increase switching speed, a non-saturating current mode of operation is used. Transistors 10 and 20 are not permitted to operate at saturation because the collectors 12 and 22 are biased by Zener diodes 14 and 24 across sources of potential 33 and 34.

The inductive type memory requires that limits be placed on the duration of the trigger pulse. If the trigger pulse persists for too long a time, the inductive time constant, which, in effect, constitutes the memory, will have time to decay sufficiently, and the memory effect will be lost and the pair will cease to act as a binary. There is no difficulty in designing a memory unit capable of performing correctly with a wide latitude of pulse durations. Binaries have been built that are capable of triggering on pulse widths ranging from 1.5 nanoseconds to 30 nanoseconds. A larger memory coil may be used to accommodate pulses wider than the aforementioned. Triggering pulses narrower than 1.5 nanoseconds have not been attempted because of lack of a suitable pulse source. The binary is capable of triggering from a continuous sine wave signal because of several recent innovations, the upper limit of continuous sine wave drive has not been determined. However, several binaries have been operated at 300 mc. The upper limit of response can be extended further with the use of improved high-frequency transistors and coaxial encapsulations to which the circuit may be easily adapted.

In the foregoing example, a 1:1 memory transformer is used to insure equal voltage pulses from both windings 15 and 25. Other winding ratios may be used to special applications. Many modifications may be made in the preferred embodiment shown above without departing from the scope of my invention. For example the circuit shown in FIGURE 2 can be easily converted into an astable multivibrator. One method of conversion is to increase voltage supply 33 thereby increasing the forward bias on the emitter-base junctions of transistors 10 and 20 to such a degree that, in conjunction with the memory transformer 36, the multivibrator will not have two stable states but two quasi-stable states. Assume transistor 10 starts to conduct faster than transistor 20. The positive voltage produced by the increasing current in winding 15 is coupled to base 21 of transistor 20, and tends to shut said transistor off. Also, because of the voltage produced in winding 15, there will be a negative voltage induced in winding 25 of memory transformer 36 which is coupled to base 11 of transistor 10 tending to make said transistor conduct harder, producing increased current flow in side 15. This regenerative action will continue until the current of transistor 10 becomes constant. Because of this constant current, the voltage induced in winding 15 will decay until it reaches the level where transistor 20 will begin to conduct. Hence, transistor 20 will start to conduct producing a positive voltage in winding 25 which is coupled to base 11 of transistor 10 tending to shut said transistor off, causing the reverse of the above described regenerative action.

NPN transistors may be substituted for the PNP transistors shown by simply reversing voltage polarities. Electron tubes and secondary-emission tubes may be used, requiring only a change in the operating voltages. In all cases, the inductive memory circuit operates as described above and will provide greatly increased switching speeds.

It is to be understood that the above described arrangements are illustrative of the applications of the principle of the invention. Numerous other arrangements may be devised by those skilled in the art without departing from the spirit and scope of this invention.

I claim:

In a multivibrator circuit and first and second transistor, each having emitter, base and collector electrodes, each of said transistors being adapted to be alternately rendered conductive or non-conductive to represent one or the other of two stable conditions, the combination consisting of: singular trigger input means applied simultaneously to said emitter electrodes of said first and second transistors for rendering said conducting transistor non-conducting a first Zener diode cross-connecting the collector electrode of said first transistor to the base electrode of said second transistor and a second Zener diode cross-connecting said collector electrode of said second transistor to the base electrode of said first transistor to prevent collector saturation, memory transformer means having a first winding connected to the commonly connected said first Zener diode and base electrode of said second transistor and a second transformer winding connected to the commonly connected said second Zener diode and base electrode of said first transistor for providing the sole switching voltage to the base of said non-conducting transistor to render said non-conducting transistor conductive upon a decrease of current flow through said first winding when said conducting transistor is rendered non-conducting by said singular input trigger signal, and for applying a holding voltage pulse to the base of said conducting transistor by said second transformer winding so as to hold said conducting transistor in a state of non-conductance.

References Cited in the file of this patent

UNITED STATES PATENTS

| | | |
|---|---|---|
| 2,759,104 | Skellett | Aug. 14, 1956 |
| 2,880,330 | Linvill et al. | Mar. 31, 1959 |
| 2,930,907 | Slobodzinski | Mar. 29, 1960 |
| 2,932,795 | Carroll | Apr. 12, 1960 |
| 2,943,212 | Hill et al. | June 28, 1960 |
| 2,997,602 | Eachus | Aug. 22, 1961 |
| 3,018,387 | Beck | Jan. 23, 1962 |
| 3,042,915 | Campbell | July 3, 1962 |
| 3,045,127 | Carey | June 17, 1962 |
| 3,066,231 | Slobodzinski et al. | Nov. 27, 1962 |

OTHER REFERENCES

Atomic Energy Commission Document UCRL 9046, January 1960.